Aug. 16, 1932.     G. W. ELSEY     1,871,969
VALVE MECHANISM
Filed Dec. 28, 1928
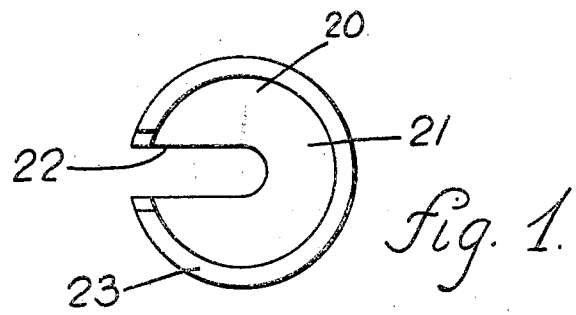
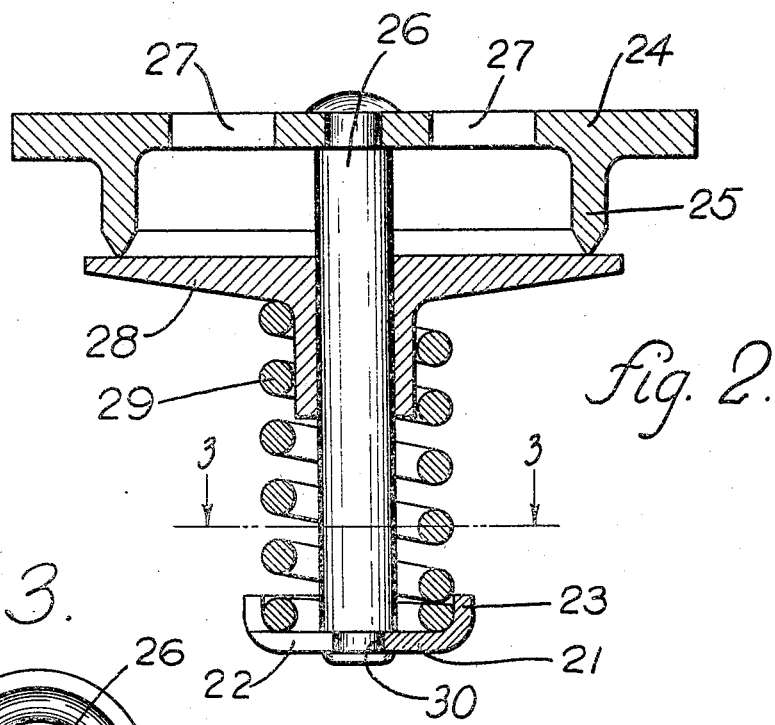
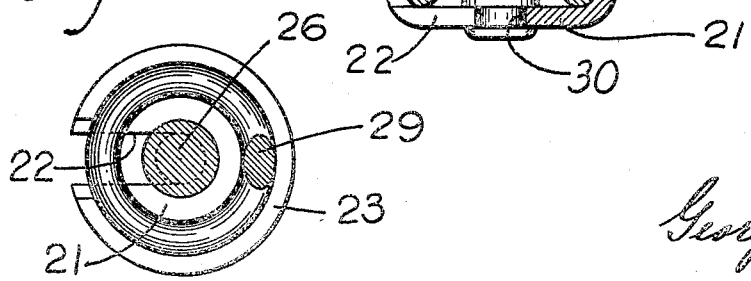
George W. Elsey, Inventor Patented Aug. 16, 1932

1,871,969

UNITED STATES PATENT OFFICE

GEORGE W. ELSEY, OF ANDERSON, INDIANA, ASSIGNOR, BY MESNE ASSIGNMENTS, TO DELCO PRODUCTS CORPORATION, OF DAYTON, OHIO, A CORPORATION OF DELAWARE

VALVE MECHANISM

Application filed December 23, 1928. Serial No. 328,885.

This invention relates to improvements in spring retainers.

It is among the objects of the present invention to provide a retainer adapted to be locked against accidental removal by the object retained.

The invention is disclosed herein as applied more particularly to a valve mechanism adaptable for use in connection with shock absorbers which cushion the movement of two relatively movable members and which includes a fluid displaceable member equipped with the valve mechanism illustrated herein. This valve mechanism provides for the transfer of fluid from one side of the fluid displaceable member to the other in response to the movement of the said member in one direction only, said valve mechanism closing tightly when said member is moved in the opposite direction.

Further objects and advantages of the present invention will be apparent from the following description, reference being had to the accompanying drawing, wherein a preferred form of the embodiment of the present invention is clearly shown.

In the drawing:

Fig. 1 is a plan view of the retainer.

Fig. 2 is a cross sectional view of the valve mechanism including the retainer.

Fig. 3 is a sectional view taken along the line 3—3 of Fig. 2.

Referring to the drawing, the spring retainer 20 is in the form of a cup-shaped C-washer. The bottom wall 21 thereof is provided with a slot 22, and has an annular, angular flange 23 forming the cylindrical wall thereof. The cylindrical wall 23, as will be seen in Fig. 1, is cut by the slot 22.

The valve mechanism illustrated comprises a valve-seat member 24 having an annular flange 25 forming the valve-seat. A valve-stem 26 is carried by the valve-seat member 24 substantially coaxial of the annular flange 25. A plurality of apertures 27 are provided in the valve-seat member 24 about the valve-stem 26 and within the portion of the valve-seat member encompassed by the annular flange 25. A valve 28 is slidably supported upon the valve stem 26 and is yieldably urged into engagement with the valve-seat or annular flange 25 by a spring 29, one end of which engages the valve 28. An annular groove 30, provided adjacent the one end of the valve stem 26, receives the retainer 20, the slot 22 thereof fitting into said annular groove 30 so that when said retainer is in position on the stem 26 annular flange 23 will be substantially coaxial of the stem 26.

The one end of spring 29 nests into the cup-shaped retainer 20, the end convolution fitting into said retainer extending across the slot 22 so that accidental removal of the retainer is substantially prevented by the spring 29.

To remove valve 28 it is necessary only to compress spring 29 so that the end convolution thereof will be removed from the cup-shaped retainer 20, thus permitting the removal of said retainer and consequent removal of the valve 28.

Applicant has provided a simple retainer which provides an abutment for a spring member and which in turn is securely locked against accidental removal by the spring which it supports.

While the form of embodiment of the present invention as herein disclosed, constitutes a preferred form, it is to be understood that other forms might be adopted, all coming within the scope of the claims which follow.

What is claimed is as follows:

1. In a device of the character described, the combination with a carrier; of a member slidably supported upon said carrier; a one piece retainer removably attached to the carrier; and a coil spring having one end convolution engaging said member and urging the member along said carrier in one direction and the other end convolution engaging the retainer and being the sole means for preventing accidental removal of said retainer from the carrier.

2. A valve mechanism comprising, in combination, a stem having a groove adjacent its one end; a valve slidable upon the stem; a C-shaped retainer cup attachable to the stem by insertion into the groove thereof; and resilient means interposed between the valve and retainer cup for operating the valve and locking the retainer cup upon the stem.

3. A valve mechanism comprising, in combination, a stem provided with an annular groove adjacent its one end; a valve provided on said stem; a coil spring fitting about the stem, the convolution at one end thereof engaging the valve; a retainer having a radial slot extending from a central opening to the outer edge of the retainer for directly receiving the grooved portion of the stem, said retainer having its peripheral edge upturned, rendering it cup-shaped to receive the other end convolution of the spring which solely prevents accidental removal of the retainer from the stem.

4. A valve mechanism comprising, in combination, a member having spaced apertures and an annular valve-seat about said apertures; a stem secured at one end to said member so as to be substantially central of said annular valve seat, said stem having an annular groove adjacent its other end; a cup-shaped retainer having a radial slot extending from a central opening completely to the outer edge of the retainer to fit over the groove in the stem; a valve slidably supported on the stem; a coil spring about the stem, interposed between the valve and retainer, one end convolution engaging the valve and yieldably urging the valve into engagement with the seat; the other end convolution seating in the cup-shaped retainer and providing a stem encircling ring within the retainer which solely prevents accidental removal thereof from the stem.

In testimony whereof I hereto affix my signature.

GEORGE W. ELSEY.